UNITED STATES PATENT OFFICE.

ARTHUR WEINBERG AND OTTO LANGE, OF FRANKFORT-ON-THE-MAIN, GERMANY, ASSIGNORS TO LEOPOLD CASSELLA & CO., OF FRANKFORT-ON-THE-MAIN, GERMANY.

ORANGE-BROWN SULFUR DYE AND PROCESS OF MAKING SAME.

SPECIFICATION forming part of Letters Patent No. 714,542, dated November 25, 1902.

Application filed July 14, 1902. Serial No. 115,684. (Specimens.)

*To all whom it may concern:*

Be it known that we, ARTHUR WEINBERG and OTTO LANGE, citizens of Prussia, and residents of Frankfort-on-the-Main, in the Province of Hesse-Nassau, Kingdom of Prussia, Germany, have invented certain new and useful Improvements in Orange-Brown Sulfur Dyes and Processes of Making Same, of which the following is a specification.

By heating metatoluylenediamin with sulfur or polysulfids brown coloring-matters have been obtained. We have now discovered that the action of sulfur on the toluylenediamin may be continued until a product is obtained which is insoluble in dilute solutions of alkaline sulfids. To this end it is necessary to continue the heating until the evolution of any sulfureted hydrogen has entirely ceased. The product so obtained is insoluble in all solvents. If, however, it be heated for some time to about 120° centigrade, preferably under pressure, together with a concentrated aqueous solution of alkaline sulfid or caustic alkali, it is transformed into a valuable sulfur color, dyeing unmordanted cotton from a bath containing alkaline sulfids orange-brown shades of absolute resistance to washing, milling, and acids.

The process is illustrated by the following example: Fifty kilos of metatoluylenediamin are introduced into one hundred and twenty-five kilos sulfur previously melted in an iron vessel provided with stirrers. As soon as the violent evolution of sulfureted hydrogen has ceased the melt is brought into a chamber which is at a temperature of about 250° centigrade and allowed to remain therein until it has formed a solid brittle mass and the smell of sulfureted hydrogen has disappeared. The melt is then pulverized and introduced into one hundred and fifty kilos crystallized sodium sulfid, previously brought to the melt. A violent reaction takes place at about 110° to 120° centigrade. The vessel is then closed and the temperature kept at 120° centigrade until the mass has become completely soluble in water. The dyestuff is obtained by desiccation, or, preferably, separated by means of acids. It dyes unmordanted cotton orange-brown shades which are hardly changed by being treated with chromates. Peroxid of hydrogen turns them brighter. The dyestuff is almost insoluble in concentrated sulfuric acid.

Having now described our invention and in what manner it may be carried out, what we claim is—

1. The process of producing an orange-brown coloring-matter by heating metatoluylenediamin with sulfur at a temperature exceeding 220° centigrade until an entirely insoluble product is obtained, and converting the thus-obtained substance into a soluble dyestuff by heating it with alkaline substances substantially as described.

2. The orange-brown coloring-matter containing sulfur obtainable as hereinbefore described, soluble in water in the presence of alkaline sulfids with an orange-brown color, which solution on the addition of acids yields a brown precipitate almost insoluble in concentrated sulfuric acid, dyeing cotton orange-brown shades substantially as described.

Signed at Frankfort-on-the-Main, in the Province of Hesse-Nassau, Kingdom of Prussia, Germany, this 18th day of June, A. D. 1902.

ARTHUR WEINBERG.
OTTO LANGE.

Witnesses:
 JEAN GRUND,
 CARL GRUND.